No. 739,125. PATENTED SEPT. 15, 1903.
J. J. VIGO.
DETACHABLE HANDLE FOR SOLDERING IRONS.
APPLICATION FILED MAR. 14, 1903.
NO MODEL.
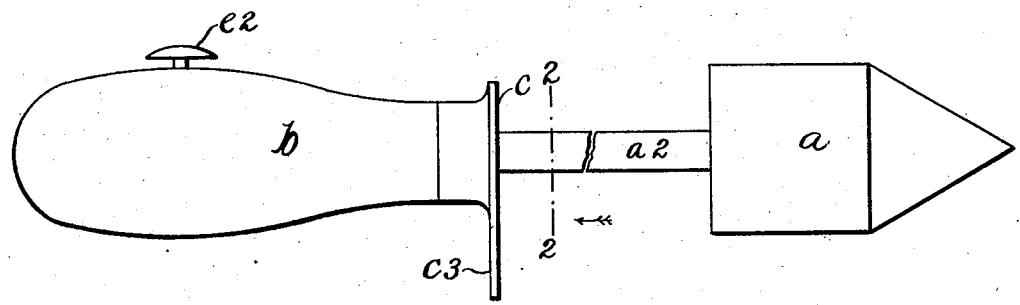
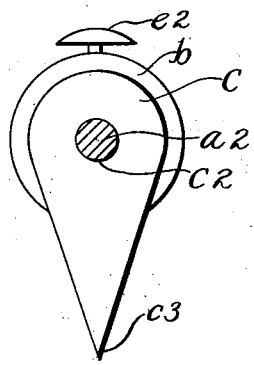
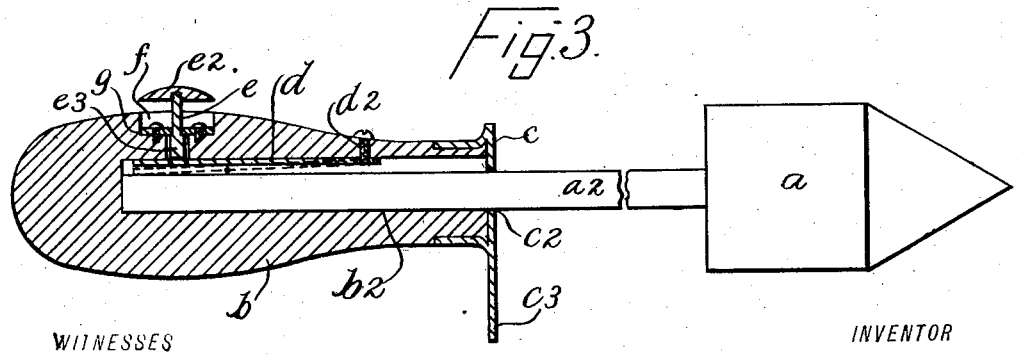
WITNESSES
S. L. Gottheimer.
J. C. Larsen
INVENTOR
James J. Vigo
BY Edgar Tate & Co
ATTORNEYS No. 739,125. Patented September 15, 1903.

UNITED STATES PATENT OFFICE.

JAMES J. VIGO, OF NEW YORK, N. Y.

DETACHABLE HANDLE FOR SOLDERING-IRONS.

SPECIFICATION forming part of Letters Patent No. 739,125, dated September 15, 1903.

Application filed March 14, 1903. Serial No. 147,696. (No model.)

*To all whom it may concern:*

Be it known that I, JAMES J. VIGO, a citizen of the United States, residing at New York, in the county of New York and State of New York, have invented certain new and useful Improvements in Detachable Handles for Soldering-Irons, of which the following is a specification, such as will enable those skilled in the art to which it appertains to make and use the same.

The object of this invention is to provide an improved handle for soldering-irons, which is adapted to be detachably connected with the shank or handle-bar of the iron, so as to be applied to different soldering-irons whenever desired and so that a number of soldering-irons may be heated at the same time and used or employed in the operation of soldering by means of a single handle, a further object being to provide a soldering-iron with a detachable handle which may also be used as a scraper for the purpose of cleaning out corners, creases, grooves, or similar cavities or recesses and for various other purposes incident to said soldering; and with these and other objects in view the invention consists in a handle for soldering-irons constructed as hereinafter described and claimed.

The invention is fully disclosed in the following specification, of which the accompanying drawings form a part, in which the separate parts of my improvement are designated by suitable reference characters in each of the views, and in which—

Figure 1 is a side view of a soldering-iron provided with my improved handle; Fig. 2, a section on the line 2 2 of Fig. 1; and Fig. 3, a central longitudinal section through the handle in position for use, as shown in Fig. 1.

In the drawings forming part of this specification I have shown at $a$ an ordinary soldering-iron, and this soldering-iron is provided with a handle-bar $a^2$, and in the practice of my invention I provide a handle $b$, which is provided with a longitudinal recess $b^2$ and to the end of which is secured a plate $c$, having an opening $c^2$, and the transverse dimensions of the longitudinal recess $b^2$ are greater than the transverse dimensions of the handle-bar $a^2$, and the opening $c^2$ in the plate $c$ is of such dimensions as to permit the handle-bar $a^2$ to freely slide therein.

To one wall of the longitudinal recess $b^2$ in the handle $b$ is secured a spring $d$, this connection being made at $d^2$ by means of a screw passed through the side of the handle or in any preferred way, the end of said spring being preferably secured near the small end of the handle, into which the handle-bar $a^2$ passes. The spring $d$ extends backwardly to or approximately to the end of the longitudinal recess $b^2$.

Mounted in the side of the handle $b$ and passing therethrough and adapted to bear on the spring $d$ is a pin $e$, which is radially movable and provided with a head $e^2$. The handle $b$ is provided in the side thereof with a recess $f$, in the bottom of which is secured a plate $g$, and the inner end of the pin $e$ is larger on the outer end, as shown at $e^3$, and the plate $g$, through which the pin $e$ passes, holds said pin in the handle $b$ and said pin is free to move radially through said handle.

The plate $c$ is also provided at one side with a prong or tapered member $c^3$, which is adapted for use in cleaning the outer corners, creases, grooves, or similar cavities or recesses and for various other purposes.

Whenever it is desired to use the soldering-iron $a$, the handle is manipulated so as to pass the handle-bar $a^2$ thereinto, and the handle $b$ is then securely grasped in such a manner that pressure will be applied to the head $e^2$ of the pin $e$. This forces the spring $d$ inwardly against the handle-bar $a^2$ and holds the handle on said bar and the soldering-iron $a$ may be used in the usual manner. With this device a number of the soldering-irons $a$ may be employed and heated at the same time, and the handle $b$ may be used in connection with either of said soldering-irons. When it is desired to remove the handle $b$ or disconnect it from the handle-bar of a soldering-iron, the pressure is removed from the head $e^2$ of the pin $e$ and said spring forces the pin $e$ outwardly, and the handle may be easily detached from the handle-bar $a^2$.

This device is simple in construction and operation and perfectly adapted to accomplish the result for which it is intended, and changes in and modifications of the construction herein described may be made without departing from the spirit of my invention.

Having fully described my invention, what

I claim as new, and desire to secure by Letters Patent, is—

1. A detachable handle for soldering-irons provided at one end with a pointed scraper which projects at right angles thereto, substantially as shown and described.

2. A detachable handle for soldering-irons, said handle being provided with a longitudinal recess which opens at one end thereof and is adapted to receive a handle-bar of a soldering-iron, said handle being also provided at said end with a pointed scraper which projects at right angles thereto, substantially as shown and described.

3. A detachable handle for soldering-irons, said handle being provided with a longitudinal recess which opens at one end thereof and is adapted to receive the handle-bar of a soldering-iron, means for holding said bar in said handle, and a pointed scraper connected with said end of said handle and projecting at right angles thereof, substantially as shown and described.

In testimony that I claim the foregoing as my invention I have signed my name, in presence of the subscribing witnesses, this 13th day of March, 1903.

JAMES J. VIGO.

Witnesses:
J. C. LARSEN,
T. A. STEWART.